Oct. 15, 1935.   F. U. WINCHESTER   2,017,114
CLAMPING NUT ASSEMBLY
Filed March 2, 1932
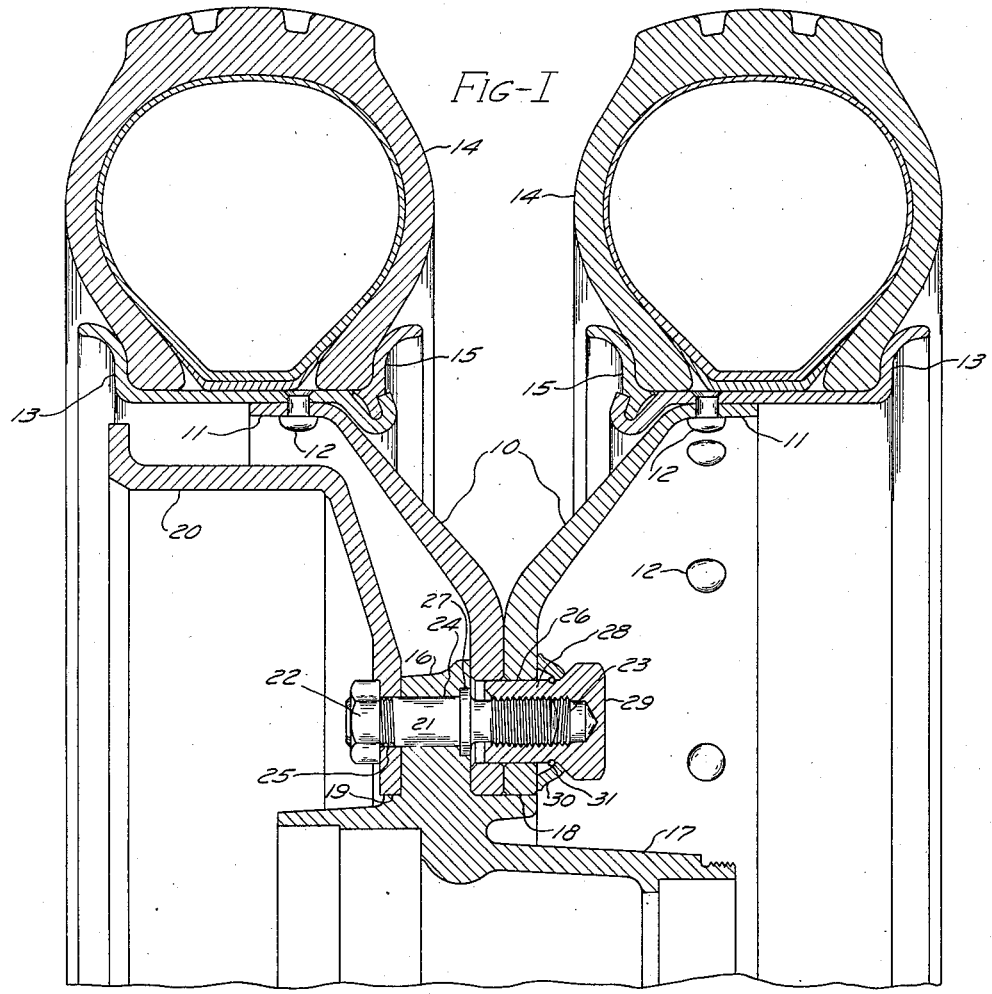
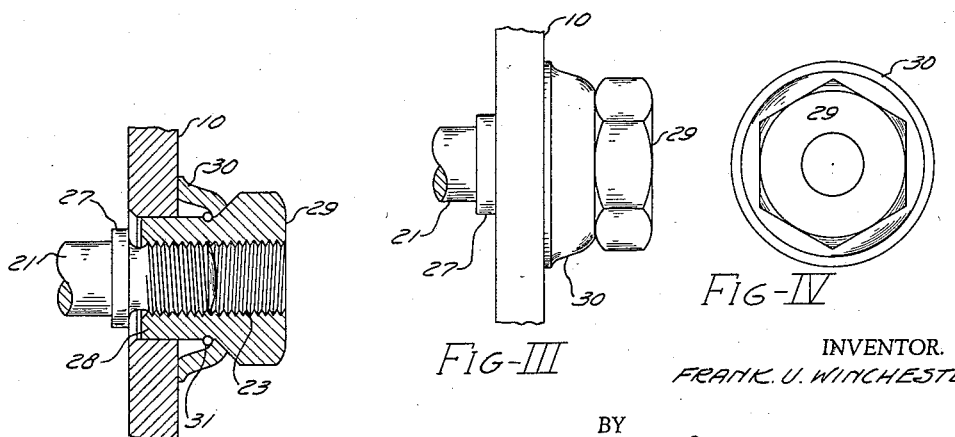
INVENTOR.
FRANK. U. WINCHESTER.
BY
Carroll R. Taber
HIS ATTORNEY.

Patented Oct. 15, 1935

2,017,114

UNITED STATES PATENT OFFICE 2,017,114

CLAMPING-NUT ASSEMBLY

Frank U. Winchester, Lansing, Mich., assignor to Motor Wheel Corporation, Lansing, Mich., a corporation of Michigan Application March 2, 1932, Serial No. 596,220

4 Claims. (Cl. 151—38)

This invention relates to clamping nut assemblies and more particularly to that type of assembly adapted to be utilized for securing a vehicle wheel to a hub flange.

The principal object of this invention is to provide a clamping nut assembly which when positioned on a conventional securing bolt extending through a vehicle wheel hub flange and vehicle body will securely position the wheel body on the hub flange and which provides the necessary resiliency to prevent the loosening of the connection between the wheel body and the hub flange when the wheel assembly is subjected to the severe shocks incident to the operation of vehicles at high speeds and under heavy loads.

Various devices for accomplishing this result have been used heretofore. One of such devices is shown in my earlier application, Serial No. 522,203, filed March 13, 1931. As therein shown and described the wheel body is secured against vertical movement with respect to the position of the wheel axle by means of an enlarged portion of the securing bolt which snugly engages the inner surface of the openings in the wheel body through which the securing bolt extends. Another device used heretofore for accomplishing this result comprises a convex securing nut threaded on to a securing bolt extending through openings in the wheel body, the edges of which are made concave to coincide with the convex surface of the securing nut. Several variations of the convex nut and concave socket arrangement have also been utilized.

The present invention provides a clamping nut which has all of the advantageous characteristics of those in use heretofore and which is adapted for use as a replacement for several of these earlier types of clamping nuts, whereby the expense of maintaining a supply of various designs in clamping nuts for replacement purposes is eliminated. This is accomplished by forming a clamping nut with a polygonal head and an interiorly threaded neck portion formed integrally therewith. The neck portion is threaded on to the securing bolt and the exterior surface thereof is adapted to engage the inner surface of the openings in the wheel body through which the securing bolt projects, the nature of the openings as to being convex, tapered, etc., being no obstacle to the use of this clamping nut. The neck portion is also provided with means for securing thereto a cup-like washer through means of which the lateral thrust of the clamping nut is transmitted resiliently to the wheel body and is distributed about the securing bolt openings therein remote from such openings.

For a more detailed description of the invention and an exemplification of its use in connection with a typical vehicle wheel reference may now be had to the drawing forming a part of this specification, in which:

Figure I is a cross sectional view in elevation of a dual vehicle wheel illustrating the manner in which the clamping nut embodying this invention is utilized for securing the wheel body to the hub flange.

Figure II is a fragmentary sectional view through the clamping nut and a portion of a modified form of vehicle wheel.

Figure III is a side view of the assembly shown in Figure II.

Figure IV is an end view of the clamping nut assembly itself.

The vehicle wheel shown in Figure I is of the dual disc type and comprises a pair of discs 10 provided with flange peripheries 11 to which are attached by means of rivets 12 a pair of rim sections 13. A pneumatic tire 14 is secured to each of the rims by means of the securing device 15. The discs 10 are secured to an annular flange 16 formed integrally with the hub 17 which is provided with a conventional opening for reception of a wheel axle. The flange portion 16 of the hub 17 may include a pair of right angle shoulders 18 and 19 on the opposite sides thereof against which the discs 10 and a conventional brake drum 20 may be positioned.

The brake drum 20 and the discs 10 are secured in position against the shoulders 19 and 18 and the opposite faces of the annular hub flange 16 by means of a securing bolt 21 projecting through an opening 25 in the brake drum, an opening 24 in the hub flange 16, and openings 26 in the discs 10.

The securing bolt 21 has a nut or head 22 formed at one extremity thereof and is provided with a threaded portion 23 at the opposite extremity. The opening 25 in the brake drum 20 and the opening 24 in the hub flange 16 are preferably formed so that the inner surfaces thereof will snugly engage the central portion of the securing bolt 21, and the openings 26 in the discs 10 are of substantially greater diameter than the diameter of the threaded portion 23 of the securing bolt. The securing bolt 21 is preferably provided with an annular shoulder or collar 27 intermediate the body portion thereof and the threaded portion 23. The collar 27 is adapted to engage an annular enlargement of the openings 24 in the hub flange 16.

The clamping nut assembly, comprising an interiorly threaded tubular member 28 having a polygonal head 29 formed integrally therewith, is adapted to be threaded on to the portion 23 of the securing bolt 21 in a manner whereby the outer surface of the tubular member 28 snugly engages the inner surface of the openings 26 through the discs 19. A cup-like washer 30 encircling the tubular member 28, and secured in position against the head 29 by means of a resilient ring 31 fitted into an annular groove formed in the tubular member 28, is adapted to resiliently transmit the lateral thrust of the head 29 to the outer surface of one of the discs 19 in a region remote from the opening 26 therethrough. The cup-like washer 30 is preferably held loosely in position against the head 29 by means of the ring 31 and is provided at the smaller extremity thereof with an inclined surface adapted to contact the inclined surface of the head 29 and at its larger extremity with a flat planular surface adapted to closely engage the surface of the disc 19.

From the foregoing description it will be apparent that the discs 19 are held against vertical movement by reason of the snug engagement of the inner surface of the openings 26 therethrough by the outer surface of the tubular member 28 threaded on to the securing bolt 21, and that the lateral thrust of the clamping member is transmitted resiliently to the disc 19 whereby the tendency for the wheel disc to become loosened due to road shocks is eliminated.

The discs shown in Figure I are of the type which have been used heretofore in combination with tapered securing nuts threaded on to a securing bolt in a manner whereby the discs were held against both vertical and lateral movement by reason of their contact with the nut itself. It will be obvious, of course, that the clamping nut assembly illustrated in Figure I might be utilized with wheel discs which have been designed for use in combination with various types of securing bolts and nuts.

Figure II illustrates the combination of the clamping nut assembly shown in Figure I with a single wheel disc in which combination the tubular portion 28 is, of course, shorter as is also the threaded portion 23 of the securing bolt 21.

Figures III and IV illustrate the general external appearance of the clamping nut assembly by itself and when in operative position as a securing means for a single disc.

While the clamping nut assembly forming the subject matter of this invention has been shown only in combination with single and double disc wheels it should be understood that it may be utilized in combination with any type wheel wherein the wheel body is secured directly to the hub flange.

It should also be understood that the examples herein shown and described are for the purpose of illustration only and that the invention is not limited thereto but is coextensive with the scope of the appended claims.

I claim:

1. The combination with a plurality of independent bodies of means for removably securing the same together comprising a securing bolt having an exteriorly threaded outer extremity extending through aligned openings formed in the bodies, a securing nut provided with an integral elongated neck threaded on to the outer extremity of the said securing bolt whereby the elongated neck extends within the opening formed in one of the bodies, and a cup-like washer encircling the elongated neck and disposed with one extremity thereof contacting the sloping surface of the nut and the other extremity contacting the surface of the adjacent body remote from the opening therethrough.

2. The combination with a plurality of independent bodies of means for removably securing the same together comprising a securing bolt having an exteriorly threaded outer extremity extending through aligned openings formed in the bodies, a securing nut provided with an integral elongated neck threaded on to the outer extremity of the said securing bolt whereby the elongated neck extends within the opening formed in one of the bodies, and a cup-like washer swivelly connected to the securing nut whereby the flared extremity thereof contacts the outer surface of one of the bodies when the nut is tightened upon the securing bolt.

3. The combination with a plurality of independent bodies of means for removably securing the same together comprising a securing bolt extending through aligned openings formed in the bodies, said securing bolt having a smooth external surface adapted to engage the opening through one of said bodies and a threaded portion extending through the opening in another of said bodies, a securing nut provided with an integral elongated neck threaded on to the securing bolt whereby the elongated neck extends within the opening formed in one of the bodies and contacts the surface of the said body within the opening, and a cup-like washer swivelly connected to the securing nut intermediate the head thereof and the adjacent surface of one of the bodies.

4. A combination of means as set forth in claim 1, in which a sloping surface corresponding to the sloping surface on the nut is provided on that extremity of the washer adapted to engage said nut.

FRANK U. WINCHESTER.